(No Model.)
W. L. WORLAND.
NUT LOCK.
No. 523,029. Patented July 17, 1894.
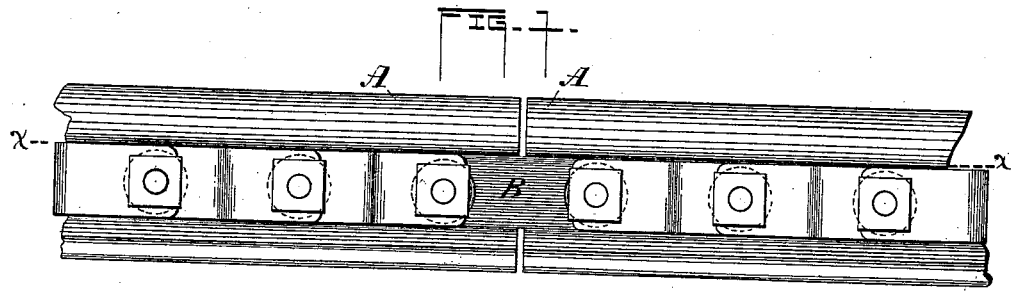
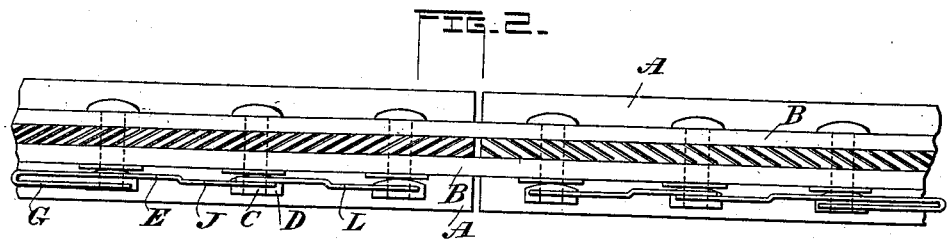
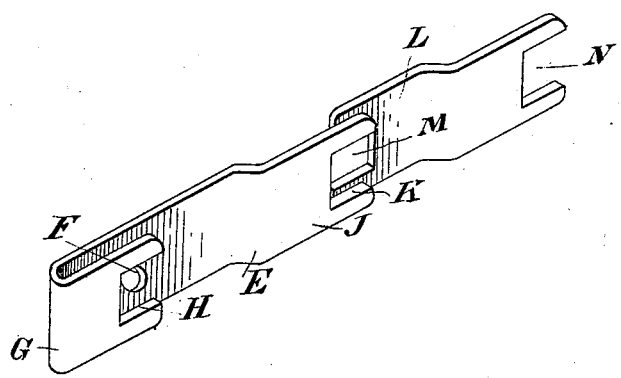
WITNESSES
Frank Blair Rives
INVENTOR
William L. Worland
By his Attorney

UNITED STATES PATENT OFFICE.

WILLIAM L. WORLAND, OF LETTS CORNER, INDIANA.

NUT-LOCK.

SPECIFICATION forming part of Letters Patent No. 523,029, dated July 17, 1894.

Application filed March 9, 1894. Serial No. 502,949. (No model.)

*To all whom it may concern:*

Be it known that I, WILLIAM L. WORLAND, a citizen of the United States of America, residing at Letts Corner, in the county of Decatur and State of Indiana, have invented certain new and useful Improvements in Nut-Locks, of which the following is a specification, reference being had therein to the accompanying drawings.

My invention relates to improvements in nut locks, and the object of my invention is the provision of a device of simple and inexpensive construction which will lock the nuts upon bolts and retain them from movement under the greatest strain and thus prove a useful, practical and economical improvement.

The invention consists of a nut lock embodying novel features of construction and combination of parts as will appear from the following description and drawings.

In the drawings I have shown my nut lock as applied to the meeting ends of a railroad track for the purpose of preventing movement of the securing nuts but I would have it understood that I may employ my nut lock in any place where it could be effectively used.

Figure 1 represents a side elevation of my nut lock. Fig. 2 represents a horizontal section thereof, and Fig. 3 represents a perspective view of my nut lock detached.

Referring by letter to the drawings: A designates the meeting ends of a railroad rail. B designates the usual fish plates one on each side of the web of the rails, C designates the bolts and D the nuts on the threaded ends of the bolts all of well known construction.

My improved nut lock illustrated in Figs. 1, 2 and 3 consists of the plate E, having the bolt opening F, the inward bent portion G, having the nut engaging kerf or recess H, also having the raised end portion J, having the nut engaging kerf or recess K, and the plate L, having the bolt opening M, and the raised portion having the nut engaging kerf or recess N, all as clearly shown and arranged to have the three engaging recesses H, K and N engage the three nuts and thus form a complete and perfect lock for the three nuts.

When the lock is employed to lock two or twin nuts the plate E will perform the act in a perfect manner as is obvious.

It will be easily understood by all skilled in such matters that I provide a nut lock of simple and inexpensive construction which will be capable of use on railroads, on machinery, on buildings and in fact in many other places and that it is entirely practical.

I claim and desire to secure by Letters Patent—

A device for locking a series of nuts, consisting of a plate having one end bent back upon itself and the opposite end offset to the plane of the bent end, a second plate similarly offset at a medial point, the extremities of each of such plates being recessed to receive a nut and the first plate being apertured to receive a bolt beneath the recess of the turned end, the recesses of the adjacent ends of both plates being brought into juxtaposition, all combined as set forth.

In testimony whereof I affix my signature in presence of two witnesses.

WILLIAM L. WORLAND.

Witnesses:
G. W. FRALEY,
EDGAR MENDENHALL.